United States Patent [19]

Hey

[11] Patent Number: 4,870,579

[45] Date of Patent: Sep. 26, 1989

[54] SYSTEM AND METHOD OF PREDICTING SUBJECTIVE REACTIONS

[75] Inventor: John B. Hey, Concord, Mass.

[73] Assignee: Neonics, Inc., Concord, Mass.

[21] Appl. No.: 103,848

[22] Filed: Oct. 1, 1987

[51] Int. Cl.$^4$ .......................... G09B 19/00; A63F 9/18
[52] U.S. Cl. .................................. 364/419; 434/236; 273/161
[58] Field of Search .............. 364/419, 401, 550, 554, 364/410; 434/237, 236; 358/86, 84; 455/2; 273/161

[56] References Cited

U.S. PATENT DOCUMENTS

| | | | |
|---|---|---|---|
| 3,952,184 | 4/1976 | Bassard | 364/419 |
| 4,041,617 | 8/1977 | Hollander | 434/237 |
| 4,205,464 | 6/1980 | Baggot | 434/237 |
| 4,331,973 | 5/1982 | Eskin et al. | 358/84 |
| 4,348,740 | 9/1982 | White | 364/900 |
| 4,546,382 | 10/1985 | McKenna et al. | 358/84 |
| 4,566,030 | 1/1986 | Nickerson et al. | 358/84 |
| 4,602,279 | 7/1986 | Freeman | 358/86 |
| 4,627,818 | 12/1986 | Von Fellenberg | 434/236 |
| 4,630,108 | 12/1986 | Gomersall | 455/2 |
| 4,646,145 | 2/1987 | Percy et al. | 358/84 |
| 4,647,964 | 3/1987 | Weinblatt | 358/84 |
| 4,658,290 | 4/1987 | McKenna et al. | 358/84 |
| 4,682,956 | 7/1987 | Krane | 434/237 |
| 4,745,549 | 5/1988 | Hashimoto | 364/402 |
| 4,781,596 | 11/1988 | Weinblatt | 434/236 |

FOREIGN PATENT DOCUMENTS 2461302 3/1981 France .................................. 364/410

OTHER PUBLICATIONS

"Difficulty and Other Correlates of Criticalness Response Style at the Item Level", Lawrence J. Stricker, Office of Naval Research Contract No. 2338(00); Project Disignation NR151-182, Edcuational Testing Service, Princeton, N.J., May 1961, pp. 1-31.

"Belief States: A Preliminary Empirical Study", Technical Documentary Report No. ESD-TDR-64-238, Mar. 1964, Thornton B. Roby, Decision Sciences Laboratory Air Force Systems Command Project No. 4690, Task No. 469003, pp. 1-34.

"Values Associated With Military Career Motivation", Leonard V. Gordan and Francis F. Medland, Technical Research Note 143, U.S. Army Personnel Research Office, Army Project No. 2J024701A722, Mar. 1964, (NTIS 11 pp.).

Primary Examiner—Parshotam S. Lall
Assistant Examiner—S. A. Melnick
Attorney, Agent, or Firm—Douglas E. Denninger

[57] ABSTRACT

A system and method of predicting, for a user selected from a group of users, the reactions of the selected user to items sampled by one or more users in the group but not sampled by the selected user. The predictions are based on other items previously sampled by that user. A scalar rating is defined for each item sampled by the selected user to represent the reaction of the selected user to that item. The selected user is successively paired with other users in the group who have defined scalar ratings for at least some of the items sampled by the selected user to determine the overall difference in ratings for items sampled by both members of each successive pair. One or more of the other users are designated as predicting users and a weighting value is assigned to each of the predicting users based on the overall difference in ratings between that predicting user and the selected user. The weighting values are applied for each item unsampled by the selected user to proportionally alter the difference between a rating previously predicted for each identified item and any actual ratings of that item by the predicting users to adjust the reaction predictions for the selected user.

25 Claims, 4 Drawing Sheets

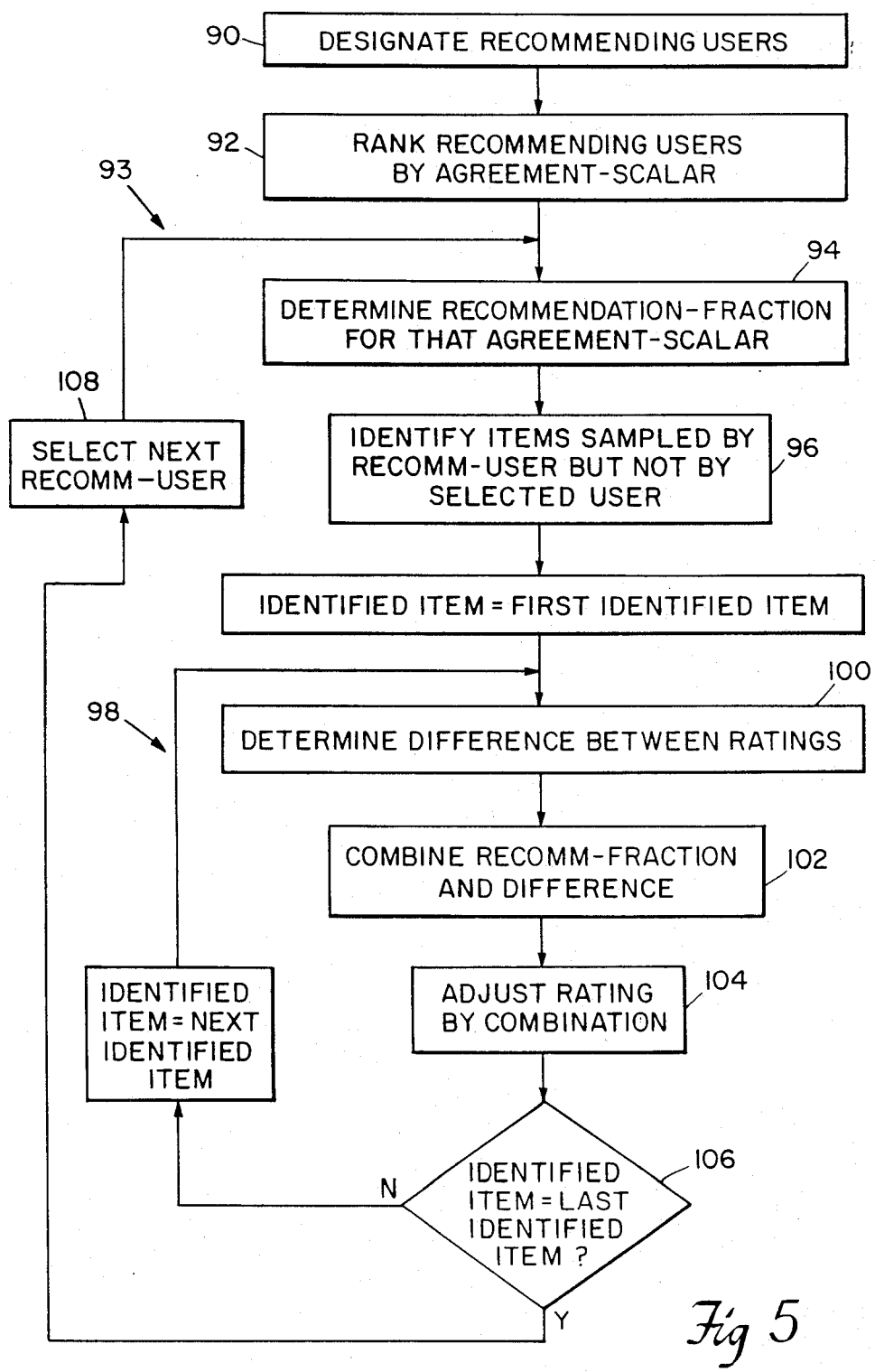

SYSTEM AND METHOD OF PREDICTING SUBJECTIVE REACTIONS

FIELD OF INVENTION

This invention relates to a system and method of predicting reactions to items not yet sampled by a user, and more particularly to such a system and method which adjust the reaction prediction for each unsampled item for that user based on the similarity in reaction of other users relative to that user.

BACKGROUND OF INVENTION

There are a number of situations in which it is helpful to predict the reactions of people to items they have not yet had the opportunity to sample. It is particularly useful to make recommendations for items to which people have wholly subjective reactions and which require a substantial investment of time or money to review, such as movies, books, music, and games. Difficulty arises because the actual reaction of a person to such an item can only be determined after money and time are invested in sampling the item.

The desirability of making recommendations for subjectively appreciated items is evidenced by the prevalence of movie critics, book reviewers, and other critics who attempt to appraise such items. However, the uniqueness of each item hinders objective comparison of the items relative to the response they will elicit from each individual. Short synopses or reviews are of limited value because the actual satisfaction of an individual depends upon his reaction to the entire rendition of the item. For example, books or movies with very similar plots can differ widely in style, pace, mood, and other characteristics. Moreover, knowledge beforehand of the plot or content can lessen enjoyment of the item.

It is common to study the advice of professional critics, but it is difficult at best to find a critic whose taste matches the taste of a particular individual. Using a combination of critics provides more information, but correctly combining and interpreting multiple opinions to extract useful advice is quite difficult. Even if a satisfactory combination is achieved, the opinions of professional critics frequently change over time as the critics lose their enthusiasm or become overly sophisticated.

Public opinion polls attempt to discern the average or majority opinion on particular topics, particularly for current events, but by their nature the polls are not tailored to the subjective opinions of any one person. Polls draw from a large amount of data but are not capable of responding to the subjective nature of a particular individual.

All of the above techniques require research by an individual, and the research is time consuming and often applied to out-of-date material. An individual is provided little help in making an optimal choice from a large set of largely unknown items.

SUMMARY OF INVENTION

It is therefore an object of this invention to provide a system and method which automatically and accurately predict the subjective reaction of a person to items not yet sampled by that person.

It is a further object of this invention to provide such a system and method which draw upon the experience of a group of people and selectively weight the reactions of the group to make accurate predictions for any person within the group.

It is a further object of this invention to provide such a system and method which can repeatedly update the predictions for each person as the experience of the group increases.

Yet another object of this invention is to provide a system and method which can evaluate a large number of items and accurately supply an individual with a list of recommendations tailored for that individual.

It is a further object of this invention to provide such a system and method which can identify items already sampled and prevent accidental repetition of sampled items.

A still further object of this invention is to provide such a system and method which require little time or effort on the part of each person in a group to obtain accurate recommendations.

Another object of this invention is to provide such a system and method which readily assimilate a new person or item and rapidly attain a useful level of predictability for each.

This invention results from the realization that truly effective prediction of subjective reactions, of one or more persons selected from a group of persons, to unsampled items such as movies, books or music, can be achieved by defining a scalar rating to represent the reaction of the selected person to each sampled item, successively pairing each selected person with other persons in the group to determine the difference in ratings for items sampled by both members of the pair, designating one or more of th other persons as predicting persons, assigning a weighting value to each of the predicting persons, and applying the weighting values to update the ratings previously predicted for each item unsampled by the selected person.

This invention features a method of predicting, for a user selected from a group of users, the reactions of the selected user to items sampled by one or more other users in the group but not sampled by that user. The predictions are also based on other items previously sampled by that user. A scalar rating is defined for each item sampled by the selected user to represent the reaction of the selected user to that item. The selected user is successively paired with other users in the group who have defined scalar ratings for at least some of the items sampled by the selected user to determine the overall difference in ratings for items sampled by both members of each successive pair. One or more of the other users are designated as predicting users and a weighting value is assigned to each of the predicting users based on the overall difference in ratings between that predicting user and the selected user. Items not yet sampled by the selected user are identified and the weighting values are applied to proportionally alter the difference between a rating previously predicted for each identified item and any actual ratings of that item by the predicting users to adjust the reaction predictions for the selected user.

In one embodiment, successively pairing includes generating for each pair an agreement scalar representing the overall rating difference between the members of that pair, and the weighting value is obtained for each of the predicting users by converting the agreement scalar into the weighting value. Pairing further includes successively matching, for each pair, items sampled by both members and, for each matched item, subtracting the ratings of one member from the ratings of the other to obtain the difference in ratings. The difference in ratings for each matched item is converted to a closeness value and summed with other closeness values for that pair. The sum of the closeness values is weighted by the number of items sampled by both members to generate the agreement scalar.

In another embodiment, designating and converting includes defining a greater weighting value for predicting users having a larger agreement scalar and defining a lesser weighting value for predicting users having a smaller agreement scalar. The designating and converting may include ranking the predicting users by ascending order of agreement scalar and defining successively larger weighting values for the ascending agreement scalars. Identifying and applying includes combining the weighting value for each predicting user with the difference between ratings by that predicting user and by the selected user for each identified item, and summing the combination with the previously predicted rating. The pairing may include successively pairing the selected users with each other user in the group or with a subset of other users in the group. The remainder of the users in the group may be successively selected to adjust the reaction predictions for each user in the group.

This invention also features a method of selectively recommending, or disrecommending, for each user successively selected from a group of users, items not sampled by the selected user. The method includes defining a scalar rating for each sampled item, successively pairing the selected user with other users in the group, generating for each pair an agreement scalar, designating at least one of the other users as recommending users, converting the agreement scalar for each of the recommending users into a recommendation-fraction, identifying items unsampled by the selected user, and applying the recommendation-fractions to proportionally decrease the difference between a rating previously established for each identified item and the ratings of that item by the recommending users to adjust the recommendations for the selected user. The method further includes successively selecting the remainder of the users in the group to adjust the recommendations for each user in the group and presenting, for each user, a plurality of items based on the recommendations for that user.

This invention further features a system for predicting the reaction to items, including means for defining a scalar rating, means for successively pairing the selected user with other users in the group to determine the difference in ratings, means for designating at least one of the other users as a predicting user, and means for assigning a weighting value to each of the predicting users based on the difference in ratings between that predicting user and the selected user. The system further includes means for applying the weighting values to items unsampled (not yet sampled) by the selected user to proportionally alter the difference between a rating previously predicted for each identified item and any actual rating of that item by the predicting users to adjust the reaction predictions for the selected user.

DISCLOSURE OF PREFERRED EMBODIMENT

Other objects, features and advantages will occur from the following description of a preferred embodiment and the accompanying drawings, in which:

FIG. 5 is a flow chart of the conversion of the agreement scalar to a recommendation-fraction and subsequent adjustment of the previously established rating of the selected person.

This invention may be accomplished by a system which predicts the reaction of a person selected from a group of persons to items not sampled by the selected person. The selected person designates, for each item sampled by the selected person, a scalar rating representing the reaction of the selected person to that item. The system successively pairs the selected person with other persons in the group who have defined scalar ratings for at least some of the items also sampled by the selected person to determine the difference in ratings for items sampled by both members of each successive pair. The system further designates one or more of the other persons as a predicting person and assigns a weighting value to each of the predicting persons based on the difference in ratings between that predicting person and the selected person. The weighting value is applied to items unsampled by the selected person to proportionally alter the difference between the rating previously predicted for the selected person for each unsampled item and the ratings of that item by the predicting persons to adjust the overall reaction predictions for the selected person.

Figure 1:
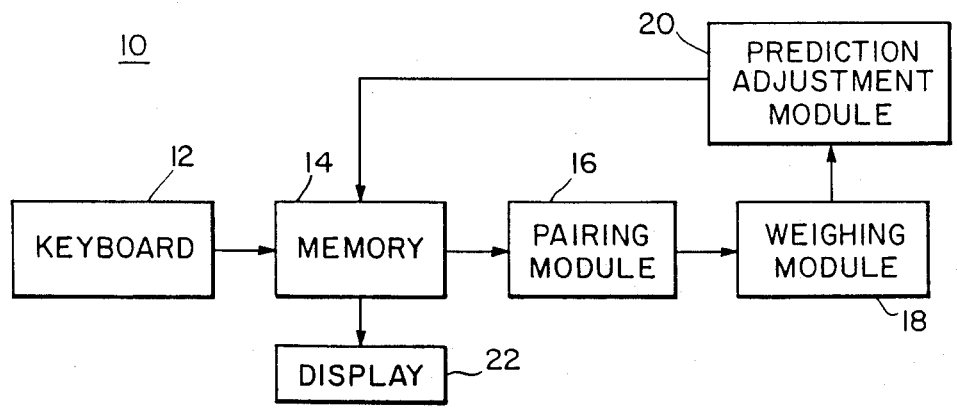
FIG. 1 is a schematic block diagram of a system according to this invention.

System 10 according to this invention, FIG. 1, includes keyboard 12 through which users of system 10 enter scalar ratings for items they have sampled. The ratings are stored in memory 14 and are selectively retrieved by pairing module 16 which, for each person for which a prediction is desired, pairs that person with a number of other persons who have previously entered scalar ratings.

A value for each pair representing the difference in ratings for items sampled by both members of each successive pair is provided to weighting module 18. For persons designated as predicting persons for the selected person, as described in more detail below, a weighting value is assigned based on the difference in ratings between that predicting person and the selected person. The weighting values are provided to prediction adjustment module 20 which applies the weighting values to items unsampled by the selected person to proportionally alter the difference between a rating previously predicted for the selected person for each unsampled item and the ratings of that item by the predicting persons. The rating previously predicted for each unsampled item represents the predicted reaction of the selected person to the up-to-now unsampled item. After adjustment, the ratings are provided to memory 14 which, when requested by a user, supplies to display 22 a list of usually the most highly recommended items for that user. Alternatively, another list based on the recommendations is provided such as a list of the most highly disrecommended items.

Figure 2:
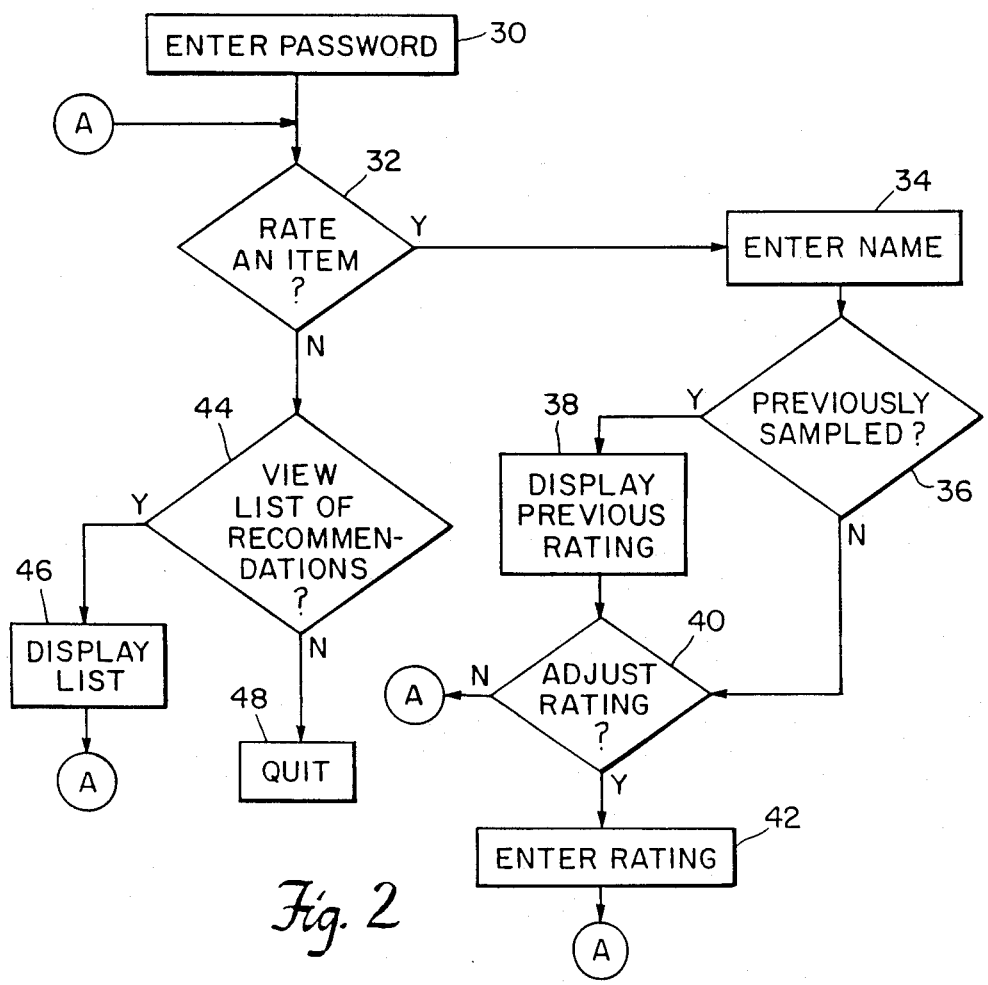
FIG. 2 is a flow chart of the use of the system of FIG. 1 by a user.

The interface between the user and system 10 is illustrated in FIG. 2. The user enters a password, step 30, and then decides to rate an item, such as a movie, step 32. To rate an item, the name of the item, such as the title of a movie, is entered into the system, step 34. If the item has been previously sampled, step 36, his previous actual rating of it is displayed, step 38. Regardless of whether the item has been actually rated, the user is allowed to adjust the rating, steps 40 and 42. Increasing the number of items actually sampled and rated increases the accuracy of reaction predictions made for other items as explained in greater detail below.

In one construction, the scalar ratings are integers ranging from 0 to 12, with "0" representing a reaction of "poor", "3" representing the reaction of "fair", "6" corresponding to a reaction of "good", "9" representing the reaction of "very good", and "12" corresponding to a reaction of "excellent". Establishing a greater number of ratings than the above-listed five verbal descriptions provides more accurate rating of the reactions of the user.

After the rating is entered, or if adjustment is declined, the operation returns to step 32. If rating of an item is not selected, the user elects to view the most current list of recommendations, steps 44, 46, or exits the system, step 48.

Figure 3:
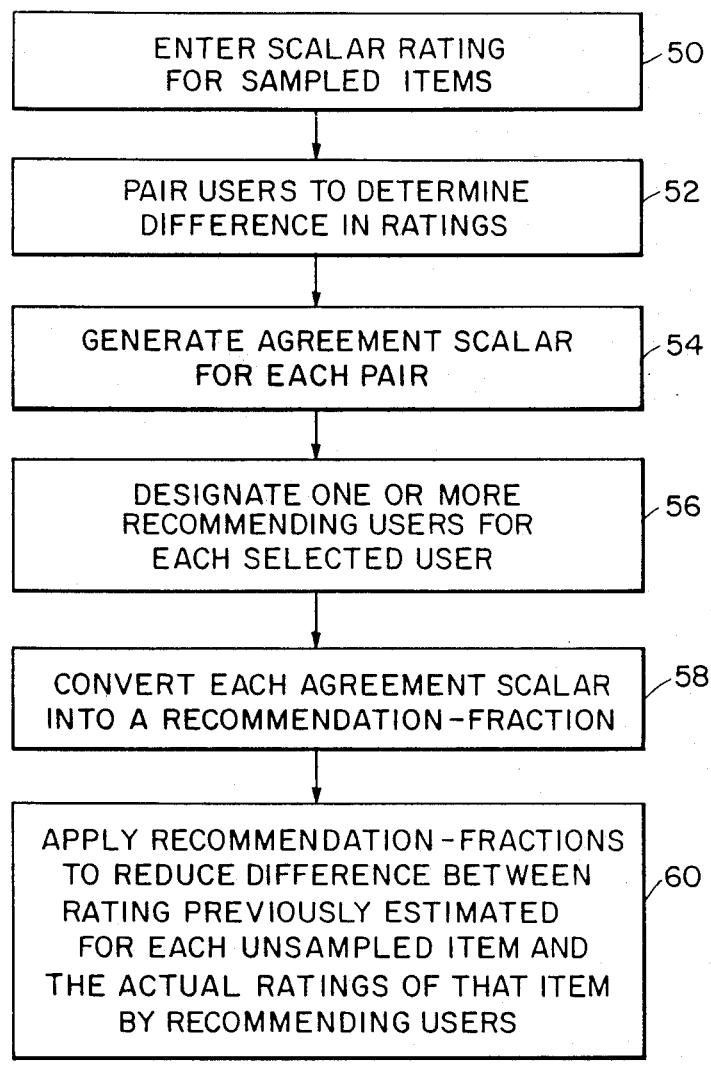
FIG. 3 is a flow chart of the operation of the system of FIG. 1 for each user selected to be updated.

The operation of system 10, FIG. 1, is summarized in FIG. 3. Each user enters a scalar rating for each item sampled by that user, step 50. Each user is successively paired, step 52, with a number of other users to determine the difference in ratings for items sampled by both users. For each pair of users, an agreement scalar is generated, step 54, to represent the overall rating difference between that pair of users. For each selected user, one or more of the other users are designated as recommending users, step 56, who contribute to ratings used to make recommendations for items to be sampled. The agreement scalar for each recommending user is then converted into a recommendation-fraction, step 58, which is then applied to reduce the difference between the rating previously estimated for each unsampled item and the actual ratings of that item by the recommending users, step 60. The recommendation-fraction is typically a fraction ranging from zero to one.

Figure 4:
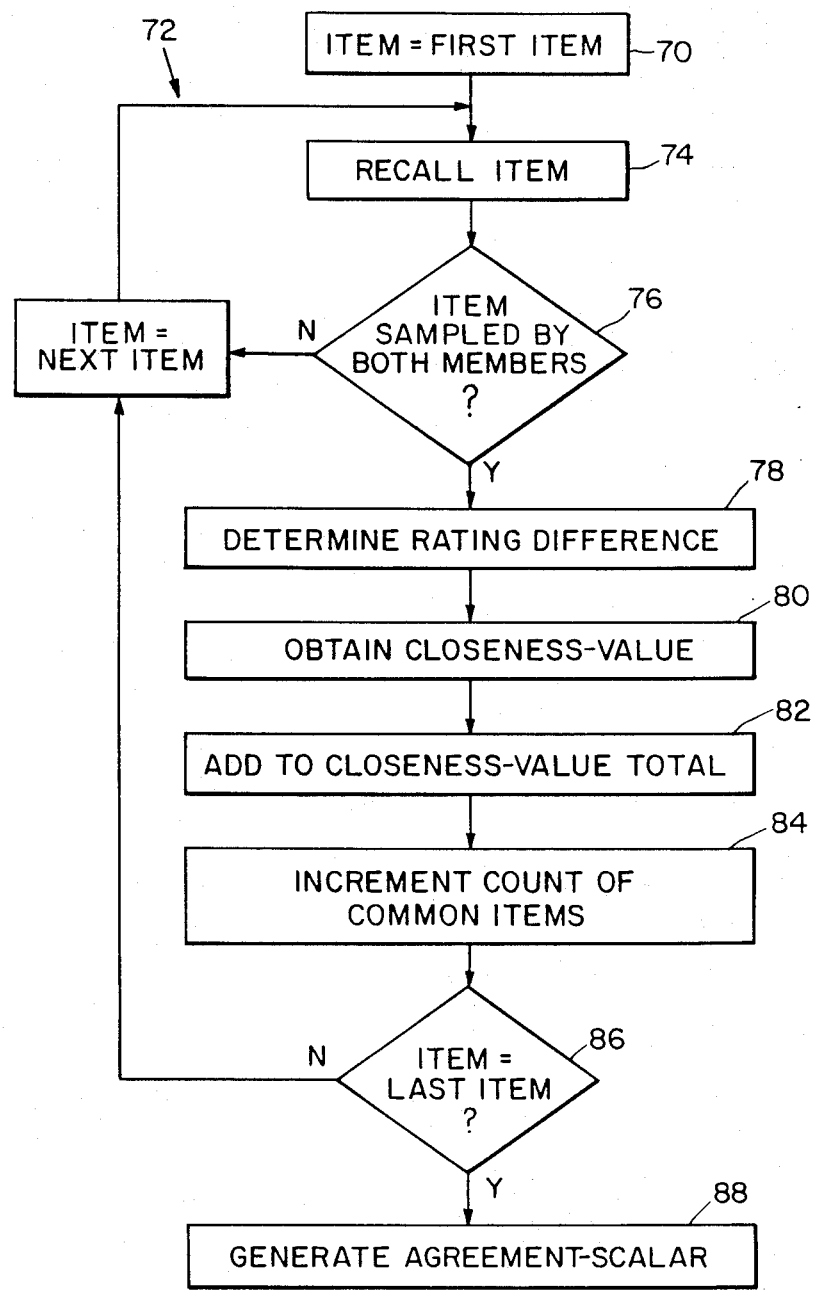
FIG. 4 is a more detailed flow chart of the pairing of users to determine the difference in ratings and to generate an agreement scalar.

The pairing of users to determine the difference in ratings and to generate an agreement scalar is shown in more detail in FIG. 4. For each pair of users, the item is set to first item, step 70, and loop 72 is entered until each of all possible items has been examined. The item is recalled, step 74, and the items for both members of the pair are matched to see if that item was sampled by both members, step 76. A number of ratings for movies are provided as an example in Table I:

TABLE I

| Movie Title | RATINGS | | |
|---|---|---|---|
| | Smith | Jones | Wesson |
| Star Wars | 8 | 11 | 10 |
| The Untouchables | 10 | 9 | 4 |
| Beverly Hills Cops | — | 10 | 10 |
| Fletch | 10 | — | 9 |
| Caddyshack | 7 | — | 11 |

The rating difference is determined, step 78, and a closeness value is obtained for that difference, step 80. In one construction, the closeness value is obtained from a look-up table such as Table II:

TABLE II

| RATING TO CLOSENESS-VALUE | |
|---|---|
| Difference in Rating | Closeness Value |
| 0 | 10 |
| 1 | 9 |
| 2 | 6 |

TABLE II-continued

| RATING TO CLOSENESS-VALUE | |
|---|---|
| Difference in Rating | Closeness Value |
| 3 | 4 |
| 4 | 2 |
| 5 | 1 |
| 6 | 0 |
| 7 | 0 |
| 8 | −1 |
| 9 | −6 |
| 10 | −8 |
| 11 | −10 |
| 12 | −10 |

Step 80 provides a weighting step in which large differences in ratings are penalized and similarities are rewarded. In other constructions, the unaltered differences themselves are used. In yet other embodiments, ratios or item-specific probabilities of the differences may be compared, or agreement by types or categories of items may be utilized.

In this embodiment, the closeness-value is added to a running total, step 82, and the count of items sampled by both members is incremented, step 84. After the last item has been processed, step 86, an agreement scalar is generated, step 88, for that pair of users. The agreement scalar may be generated by the use of the following equation:

$$AS = (CVT)(2n-1)/n^2 \qquad (1)$$

where AS is the agreement scalar, CVT is the closeness-value total, and n is the count of items sampled by both users. By the example provided in Tables I and II, Smith and Jones have sampled two items in common having a difference in ratings of 3 and 1, respectively, which are assigned closeness values of 4 and 9, respectively. By application of equation (1), the agreement scalar for Smith and Jones is 9.75. Similarly, the closeness-value for the pair of Smith and Wesson is 17 and the agreement scalar is 7.44. The difference in reaction of Smith and Wesson to "The Untouchables" and "Caddyshack" led to the smaller agreement scalar between those users. It is evident that the greater the number of items that the users have sampled, the more accurate the agreement scalar will be for each of the users with which the selected user is paired.

The conversion of the agreement scalar to a weighting value, referred to as a recommendation-fraction, and adjustment of the previously established ratings is shown in FIG. 5. One or more recommending users are designated, step 90, from the group of users. If the number of users is small, the entire group may be used. Otherwise, a subset of the group, e.g. sixteen users may be used. Successive ones of the users are designated as selected users while the remainder of the subset are designated as recommending users.

The recommending users are ranked by order of agreement scalar, step 92. Each recommending user is then utilized to adjust the previously established predicted ratings for the selected user, loop 93. A recommendation-fraction is defined for the agreement scalar of the first recommending user, step 94. It is desirable to rank the recommending persons by ascending order of agreement scalar and in that order assigning to the ranked predicting persons progressively larger weighting values. In one embodiment, for the fourth highest agreement scalar a recommendation-fraction of 1/16 is defined, for the third highest a recommendation fraction of ⅛ is defined, for the second highest a recommendation-fraction of ¼ is defined, and for the highest a recommendation-fraction of ½ is defined. All other agreement scalars are assigned a value of zero for their recommendation-fraction. The lists of items for the recommending user and the selected user are matched to identify, at step 96, items sampled by the recommending user but not by the selected user. Each identifying item is analyzed in loop 98 in which the difference between ratings is determined, the recommendation-fraction and the difference are combined, and the rating is adjusted by the combination, steps 100, 102, 104, respectively. When the recommendation-fraction has been combined with the difference for each item including the last identified item, step 106, the next recommending user is selected, step 108.

In one embodiment, a difference between the ratings is determined by subtracting the previously estimated rating of the selected user from the actual rating of the recommending user. The difference is then multiplied by the recommendation-fraction to obtain an adjustment, and the adjustment is added to the previously estimated rating. When the recommending users are ranked in order of lowest to highest agreement scalar, the relative adjustment accorded by the recommending user with the highest scalar is enhanced. That is, his weighting effect is not diluted by later adjustments from less appropriate recommending users.

While the terms "person" and "user" as used above refer to a human being, the terms are used in their broadest sense to refer to any entity which exhibits a subjective but not random reaction to an item. The above-described system and method of operation according to the present invention similarly apply to more than movies, record albums, computer games, or other consumer items. For example, reactions can be predicted for travel destinations, hotels, restaurants, or careers. Further, predictions among categories can be accomplished, e.g., recommending books based on the ratings of movies. The system and method according to this invention are particularly useful for items which have significance in and of themselves to people, that is, predicting the reactions of people to the items benefits the people in optimally directing their investment of time and money in choosing and sampling items.

Although specific features of the invention are shown in some drawings and not others, this is for convenience only as each feature may be combined with any or all of the other features in accordance with the invention. Other embodiments will occur to those skilled in the art and are within the following claims:

What is claimed is:

1. A method of automatically predicting, for a user selected from a group of users, the reactions of the selected user to items sampled by one or more users in the group but not sampled by the selected user, the reaction predictions being based on other items previously sampled by that of the user, comprising:

defining, for each item sampled by the selected user, a scalar rating representing the reaction of the selected user to that item;

successively pairing the selected user with other users in the group for whom have been defined scalar timings for at least some of the items sampled by the selected user to determine the difference in ratings for items sampled by both members of each successive pair;

designating at least one of the other users as a predicting user and assigning a weighting value to each of the predicting users based on the difference in ratings between that predicting user and the selected user; and applying the weighting values to items not yet sampled by the selected user to proportionally alter the difference between a rating previously predicted for each item not yet sampled by the selected user and the ratings of that item by the predicting users to adjust the reaction predictions for the selected user to more closely predict the actual reaction of the user to that item.

2. A method using a computing device to automatically predict, for a user a selected from a group of users, the reactions of the selected user to items sampled by one or more users in the group but not sampled by the selected user, the reaction predictions being based on other items previously sampled by that user, comprising:

defining, for each item sampled by the selected user, a scalar rating representing the reaction of the selected user to that item, the step of defining including entering, into an input device of the computing device, information representing the reaction of the selected user to items sampled by that user;

successively pairing the selected use with other users in the group for whom have been defined scalar ratings for at least some of the items sampled by the selected user to determine the difference in ratings for items sampled by both members of each successive pair;

designating at least one of the other users as a predicting user and as singing a weighting value to each of the predicting users based on the difference in ratings between that predicting user and the selected user; and applying the weighting values to items not yet sampled by the selected user to proportionally alter the difference between a rating previously predicted for each item not yet sampled by the selected user and the ratings of that item by the predicting users to adjust the reaction predictions for the selected user to more closely predict the actual reaction of the user to that item.

3. The method of claim 2 in which pairing includes successively matching, for each pair, items sampled by both members and, for each matched item, comparing the ratings of one member from the rating of the other member to obtain the difference in ratings.

4. The method of claim 3 in which pairing further includes converting, for each pair, the difference in ratings for each matched item to a closeness value, and combining the closeness values for the members of that pair.

5. The method of claim 4 in which pairing further includes weighting, for each pair, the combined closeness values by the number of items sampled by both members to generate the agreement scalar.

6. The method of claim 2 in which designating and converting includes defining a greater weighting value for predicting users having a larger agreement scalar and defining a lesser weighting value for predicting users having a smaller agreement scalar.

7. The method of claim 2 in which designating and converting includes ranking the predicting users by ascending order of agreement scalar and in that order assigning to the ranked predicting users progressively larger weighting values.

8. The method of claim 2 in which applying includes combining the weighting value for each predicting user with the difference between the actual rating by that predicting user and the previous predicted rating by the selected user for each unsampled item, and summing the combination with the previously predicted rating.

9. The method of claim 2 in which pairing includes successively pairing the selected user with each other user in the group.

10. The method of claim 2 in which pairing includes defining a subset of other users in the group to be successively paired with the selected user.

11. The method of claim 2 further including successively selecting the remainder of the users in the group to adjust the reaction predictions for each user in the group.

12. A method of selectively recommending, for each user successively selected from a group of users, items sampled by one or more users in the group but not yet sampled by the selected user, the recommendations being based on other items previously sampled by that user and being represented by a scalar rating for each item, the method comprising:
    defining, for each item sampled by the selected user, a scalar rating representing the reaction of the selected user to that item;
    successively pairing the selected user with other users in the group for whom have been defined scalar ratings for at least some of the items sampled by the selected user to determine the difference in ratings for items sampled by both members of each successive pair;
    generating for each pair an agreement scalar representing the overall rating agreement between the members of that pair;
    designating at least one of the other users as recommending users;
    converting, for each of the recommending users, the associated agreement scalar into a recommendation-fraction;
    identifying items not yet sampled by the selected user;
    establishing an initial scalar rating for each identified item for the selected user;
    applying the recommendation-fractions to proportionally decrease the difference between one of the initial scalar rating for each identified item and a scalar rating previously established for each identified item for the selected user and the actual ratings of that item by the recommending users to adjust the recommendations for the selected user;
    successively selecting the remainder of the users in the group to adjust the recommendations for each user in the group by the above-recited steps; and
    presenting, for each user, a plurality of items based on the recommendations for that user.

13. The method of claim 12 in which pairing includes successively matching, for each pair, items sampled by both members and, for each matched item, comparing the rating of one member with the rating of the other member to obtain the difference in ratings.

14. The method of claim 13 in which pairing further includes converting, for each pair, the difference in ratings for each matched item to a closeness value, and combining the closeness values for the members of that pair.

15. The method of claim 14 in which pairing further includes weighting, for each pair, the combined closeness values by the number of items sampled by both members to generate the agreement scalar.

16. The method of claim 15 in which designating and converting includes sorting the recommending users by ascending order of agreement scalar and in that order assigning to the ranked predicting users progressively larger weighting values.

17. The method of claim 16 in which applying includes combining the weighting fraction for each recommending user with the difference between the actual rating by that recommending user and the previous predicted rating by the selected user for each identified item, and summing the combination with the previously established rating.

18. The method of claim 17 further including initially setting the established rating for each unsampled item for each selected user to a low rating value.

19. The method of claim 12 in which presenting includes providing a listing of a limited number of highly recommended items not yet sampled by the selected user.

20. The method of claim 12 in which establishing includes providing a low scalar rating value as the initial scalar rating.

21. A system for predicting, for a user selected from a group of users, the reactions of the selected user to items sampled by one or more users in the group but not sampled by the selected user, the predictions being based on other items previously sampled by that user, comprising:
    means for defining, for each item sampled by the selected user, a scalar rating representing the reaction of the selected user to that item, said means for defining including input means for entering information representing the reaction of the selected user to items sampled by that user;
    means for successively pairing the selected user with other users in the group for whom have been defined scalar ratings for at least some of the items sampled by the selected user to determine the difference in ratings for items sampled by both members of each successive pair;
    means for designating at least one of the other users as a predicting user and assigning a weighting value to each of the predicting users based on the overall difference in ratings between that predicting user and the selected user; and
    means for applying the weighting values to items not yet sampled by the selected user to proportionally alter the difference between a rating previously predicted for each item not yet sampled by the selected user and the ratings of that item by the predicting users to adjust the reaction predictions for the selected user to more closely predict the actual reaction of the user to that item.

22. A computing device for predicting, for a user selected from a group of users, the reactions of the selected user to items sampled by one or more users in the group but not sampled by that user, the prediction being based on other items previously sampled by that user, comprising:
    means for defining, for each item sampled by the selected user, a scalar rating representing the reaction of the selected user to that item, said means for defining including input means for entering information representing the reaction of the selected user to items sampled by that user;

means for successively pairing the selected user with others users in the group for whom have been defined scalar ratings for at least some of the items sampled by the selected user to determine the difference in rating for items sampled by both members of each successive pair, said means for pairing including means for generating for each pair an agreement scalar representing the overall rating difference between the members of that pair;

means for designating at least one of the other users as a predicting user and for converting, for each of the predicting users, the agreement scalar into a weighing fraction;

means for establishing an initial scalar rating for each identified item for the selected user; and means for identifying items not yet sampled by the selected user and applying the weighting values to items not yet sampled by the selected user to proportionally alter the difference between one of the initial scalar rating for each identified item and a rating previously predicted for each identified item and the ratings of that item by the predicting users to adjust the reaction predictions for the selected user to more closely predict the actual reaction of the user to that item.

23. The computing device of claim 22 in which said means for establishing establishes said initial scalar rating based on information entered through said input means.

24. The computing device of claim 22 in which said means for establishing includes memory for storing said initial scalar rating.

25. A method of using a computing device to automatically update, for a user selected from a group of users, estimated scalar ratings for items sampled by one or more users in the group but not yet sampled by the selected user to more closely predict the reaction of the selected user to the not-yet-sampled items, the method comprising:

defining, for each item sampled by the selected user, an actual scalar rating representing the actual reaction of the selected user to that item, the step of defining including entering, into an input device of the computing device, information representing the reaction of the selected user to items sampled by that user;

defining, for each item sampled by other users in the group, an actual scalar rating representing the actual reaction of each user to that item, including entering into the input device information representing the reaction of the other users to items sampled by each user;

successively pairing the selected user with other users in the group for whom have been defined actual scalar rating for at least some of the items sampled by the selected user to determine the difference in actual ratings for items sampled by both members of each successive pair;

designating a plurality of the other users as updating users and assigning a weighting value to each of the updating users based on the difference on actual ratings between that updating user and the selected user;

establishing an initial estimated rating for items not yet sampled by the selected user; and applying the weighting values, for items not yet sampled by the selected user, to proportionally alter the difference between one of (a) the initial estimated rating for each item not yet sampled and (b) an estimated rating previously updated for each item not yet sampled by the selected user and the actual ratings of that item by the updating users to adjust the estimated ratings for the selected user to more closely predict the actual reaction of the user to that item.

* * * * *